United States Patent
Chang et al.

(10) Patent No.: US 8,431,056 B2
(45) Date of Patent: *Apr. 30, 2013

(54) METHOD FOR MANUFACTURING PLASTIC ARTICLE

(75) Inventors: Chun-Yuan Chang, Taipei Hsien (TW); Chung-Chi Tseng, Taipei Hsien (TW); Li-Fu Liu, Taipei Hsien (TW); Yu-Tang Shih, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 310 days.

This patent is subject to a terminal disclaimer.

(21) Appl. No.: 12/755,439

(22) Filed: Apr. 7, 2010

(65) Prior Publication Data

US 2010/0260982 A1 Oct. 14, 2010

(30) Foreign Application Priority Data

Apr. 8, 2009 (CN) .......................... 2009 1 0301428

(51) Int. Cl.
*B29C 45/16* (2006.01)
*B29C 45/56* (2006.01)

(52) U.S. Cl.
USPC ............ 264/139; 264/160; 264/266; 264/275

(58) Field of Classification Search .................. 264/139, 264/160, 241, 247, 255, 259, 266, 267, 275, 264/279, 319
See application file for complete search history.

(56) References Cited

U.S. PATENT DOCUMENTS

| | | | |
|---|---|---|---|
| 5,096,652 A * | 3/1992 | Uchiyama et al. | 264/511 |
| 5,543,094 A * | 8/1996 | Hara et al. | 264/46.4 |
| 5,676,896 A * | 10/1997 | Izumida et al. | 264/132 |
| 6,277,312 B1 * | 8/2001 | Hansen et al. | 264/132 |
| 6,730,251 B1 * | 5/2004 | Eschenfelder et al. | 264/153 |

FOREIGN PATENT DOCUMENTS

| | | | |
|---|---|---|---|
| JP | 07-164475 | * | 6/1995 |
| JP | 11-262964 | * | 9/1999 |
| JP | 2000-355027 | * | 12/2000 |

* cited by examiner

*Primary Examiner* — Jill Heitbrink
(74) *Attorney, Agent, or Firm* — Altis Law Group, Inc.

(57) ABSTRACT

A method for forming a plastic article is provided. An uninterrupted film with a hard-coating layer is provided and transported into a mold. A predetermined area of the film attaches to an inner surface of a cavity of a female mold of the mold. The predetermined area of the film is cut from the uninterrupted film during closing the mold.

4 Claims, 8 Drawing Sheets

METHOD FOR MANUFACTURING PLASTIC ARTICLE

CROSS-REFERENCE TO RELATED APPLICATION

Relevant subject matter is disclosed in co-pending U.S. patent applications (application Ser. Nos. 12/732,141, 12/755,428, and 12/755,441), and entitled "PLASTIC ARTICLE AND METHOD OF MANUFACTURING THE SAME", "ATTACHING FILM", and "ATTACHING FILM", respectively, wherein application Ser. No. 12/732,141 is filed on Mar. 25, 2010, application Ser. Nos. 12/755,428, and 12/755,441 are filed on Apr. 7, 2010.

TECHNICAL FIELD

The disclosure relates to a plastic article, and an in-mold-decoration (IMD) method for manufacturing the plastic article.

DESCRIPTION OF RELATED ART

A common method for IMD is covering an attached film to a molded product to decorate or protect the molded product. The attached film usually includes a carrier layer, a peeling layer, a protecting layer, and an attaching layer attached to the base of the molded product. While the carrier layer and the peeling layer are released from the molded product, the protecting layer functions as a scratch/abrasion-resistant for the attaching layer and the base. But the protecting layer always gets damaged.

DETAILED DESCRIPTION

Figure 1:
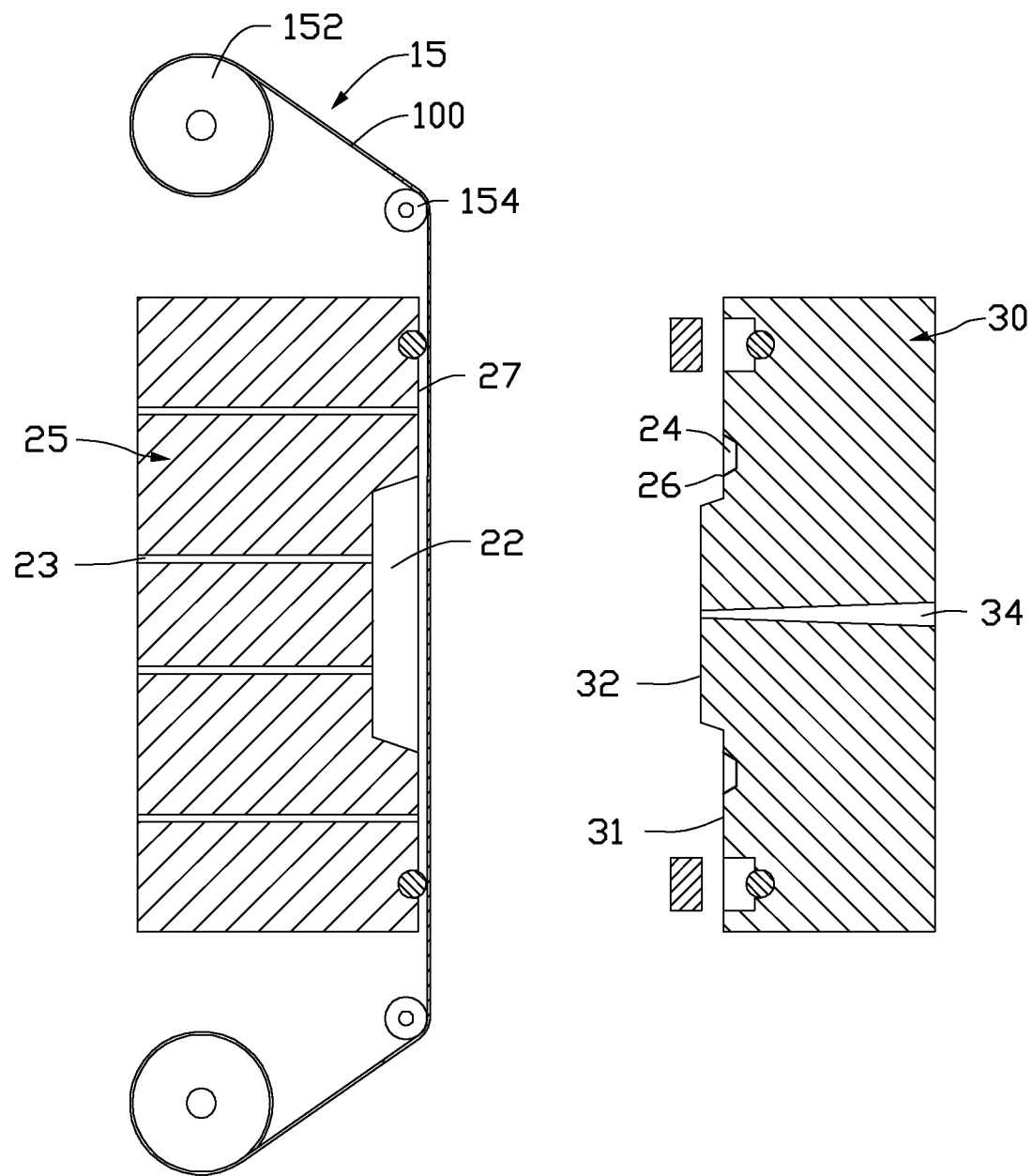
FIG. 1 is a cross-sectional view of an injection mold used in an embodiment of a method of manufacturing a plastic article.

Referring to FIG. 1, an exemplary embodiment of an injection mold for in-mold-decoration includes a transport 15, a female mold 25, and a male mold 30.

The transport 15 includes two transporting rollers 152 and two guiding rollers 154 positioned at opposite ends of the mold respectively, for transporting a film 100 into the female and male molds 25 and 30.

The female mold 25 defines a cavity 22 in a first side 27. A plurality of air venting holes 23 define in the female mold 25 and connect to the cavity 22. Each air venting hole 23 connects to a vacuum pump (not shown) for adsorbing the film 100 that disposes into the female and male molds 25 and 30 into the cavity 22.

Figure 2:
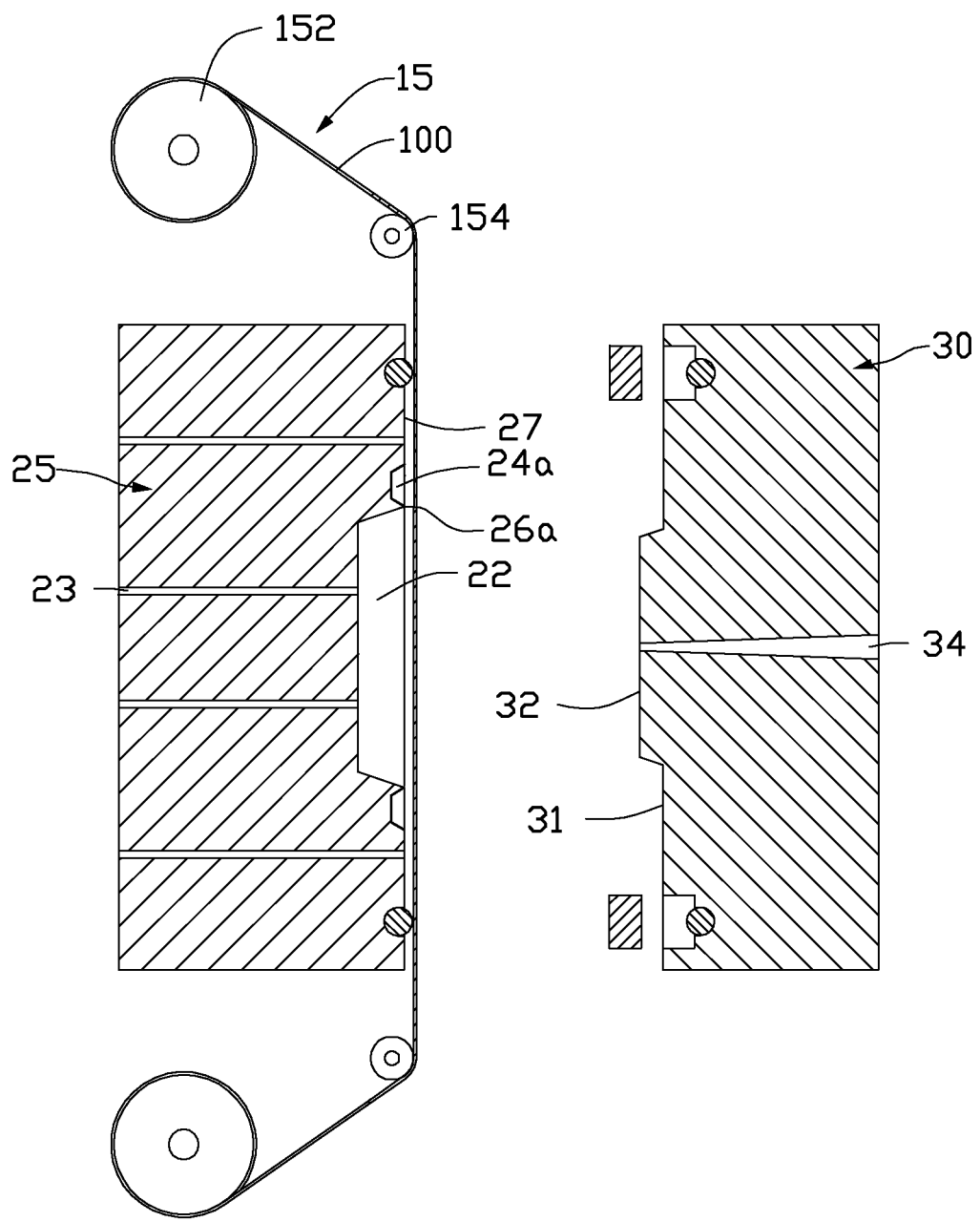
FIG. 2 is a cross-sectional view of a variational injection mold used in the method of manufacturing the plastic article.

The male mold 30 includes a second side 31 facing the first side 27 of the female mold 25, the second side 31 forms a protrusion 32 protruding towards the female mold 25 and mating with the cavity 22 of the female mold 25. An injection port 34 defines in a center of the protrusion 32, for injecting molten resin into the cavity 22. A slot 24 defines in the second side 31 of the male mold 30 around the protrusion 32. A cutting portion 26 forms on a wall bounding the slot 24 between the protrusion 32 and the slot 24. Referring to FIG. 2, in another embodiment, the female mold 25 defines a slot 24a around the cavity 22. A cutting portion 26a is formed on a wall bounding the slot 24a and the cavity 22.

Figure 3:
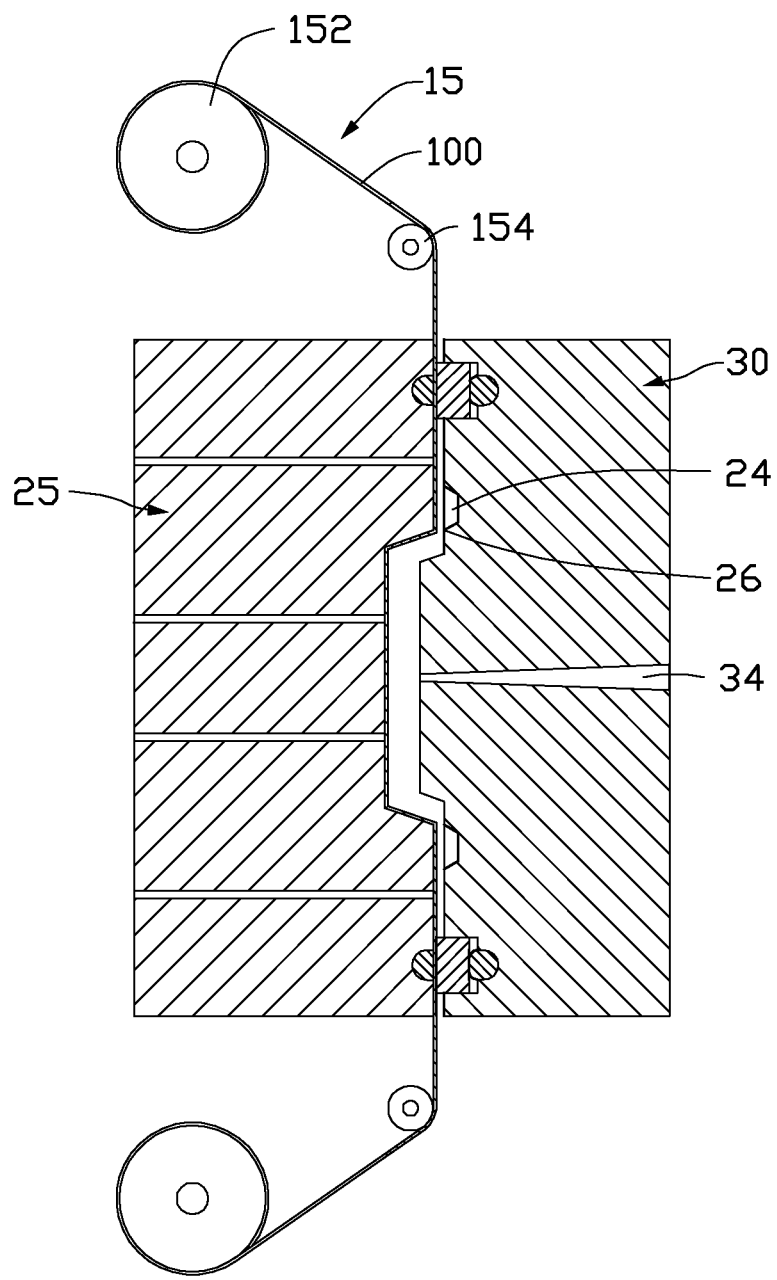
FIG. 3 is similar to FIG. 1, but showing the injection mold closed to a first position.
Figure 4:
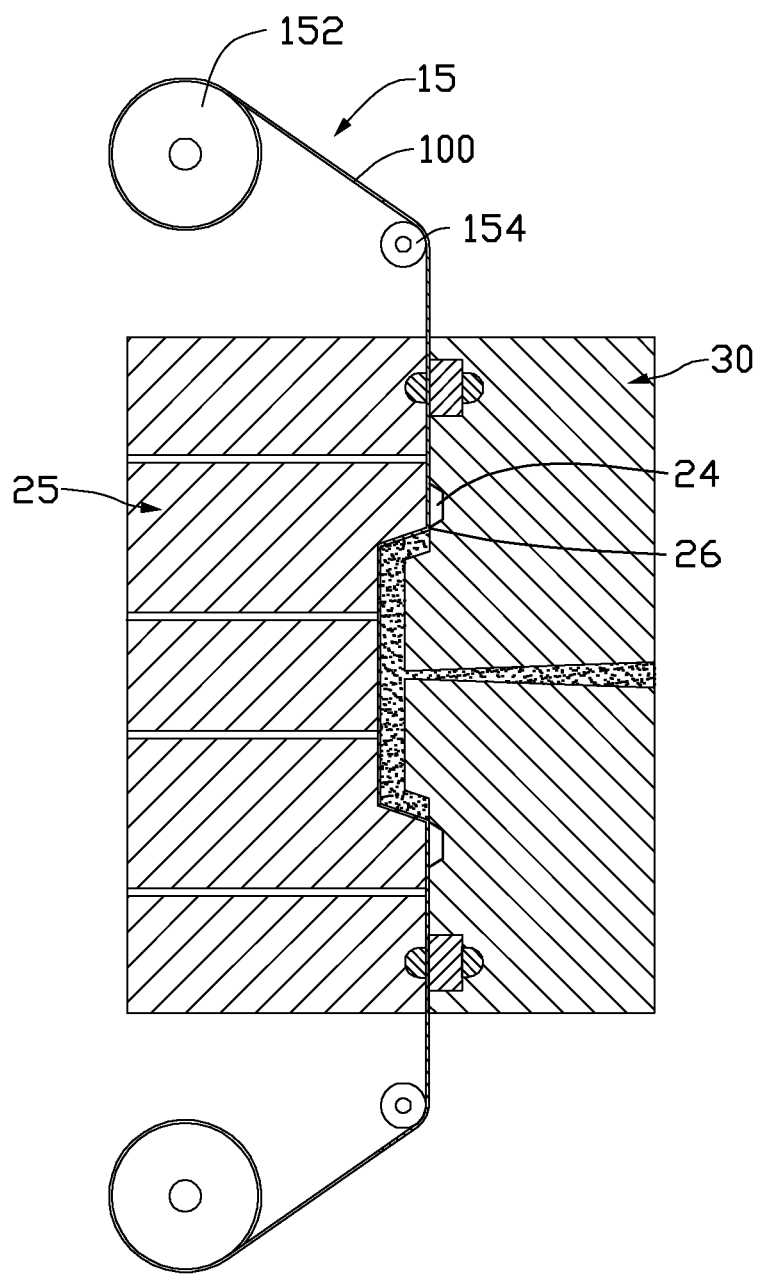
FIG. 4 is similar to FIG. 3, but showing the injection mold closed to a second position.
Figure 5:
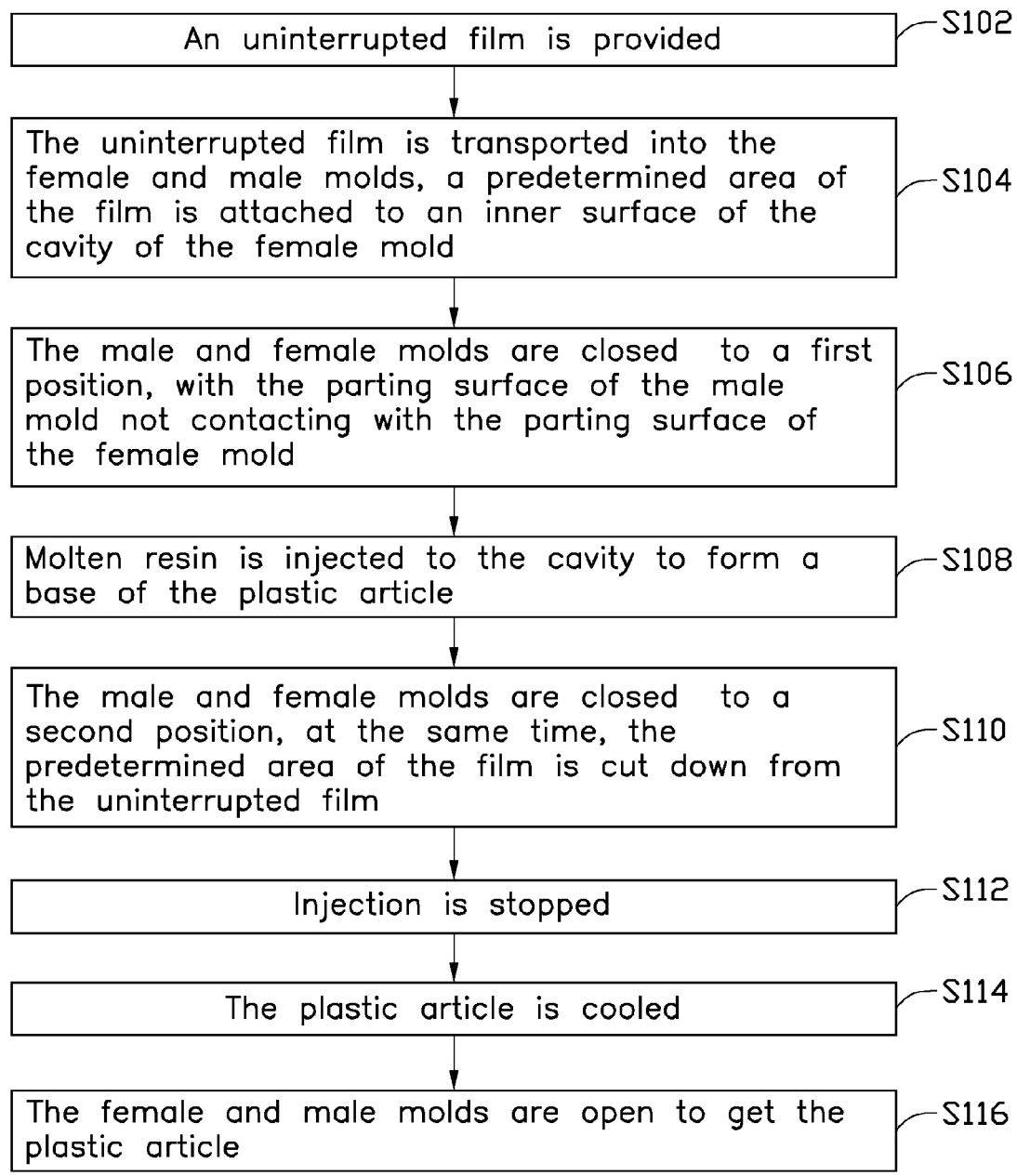
FIG. 5 is a flowchart of a first exemplary embodiment of a method for manufacturing the plastic article.

Referring to FIGS. 3-5, a first exemplary embodiment of a method using the above-mentioned injection mold to manufacture a plastic article, includes the following steps.

Step S102, the uninterrupted film 100 with patterns and characters printed thereon, is provided, and rolled around the transporting rollers 152 of the transport 15.

Step S104, the uninterrupted film 100 is transported between the female and male molds 25 and 30 by the transport 15, a predetermined area of the film 100 attaches to an inner surface of the cavity 22 of the female mold 25. In one embodiment, the predetermined area of the film 100 attaches to the inner surface of the cavity 22 by vacuumizing the cavity 22 through the plurality of air venting holes 23 of the female mold 25.

Step S106, the male and female molds 30 and 25, close to a first position, with the parting surface of the male mold 30, the second side 31, not contacting the parting surface of the female mold 25, the first side 27.

Step S108, molten resin is injected into the cavity 22 through the injection port 34 of the male mold 30 to form a base of the plastic article. At first, about 90%-99.5% of the molten resin is injected into the cavity 22. In this process, the predetermined area of the film 100 attaches to the base of the plastic article.

Step S110, the male and female molds 30 and 25 further close to a second position, at this time, the remnant of molted resin is injected into the cavity 22. The parting surface of the male mold 30 presses the parting surface of the female mold 25, thus the cutting portion 26 of the male mold 30 cuts the predetermined size of the film 100 attached to the base of the plastic article.

Step S112, injection stops.

Step S114, the plastic article cools.

Step S116, the female and male molds 25 and 30 open to retrieve the plastic article whose surface is covered by the film 100. At this time, the transport 15 transports the film 100 to prepare a next molding cycle.

Figure 6:
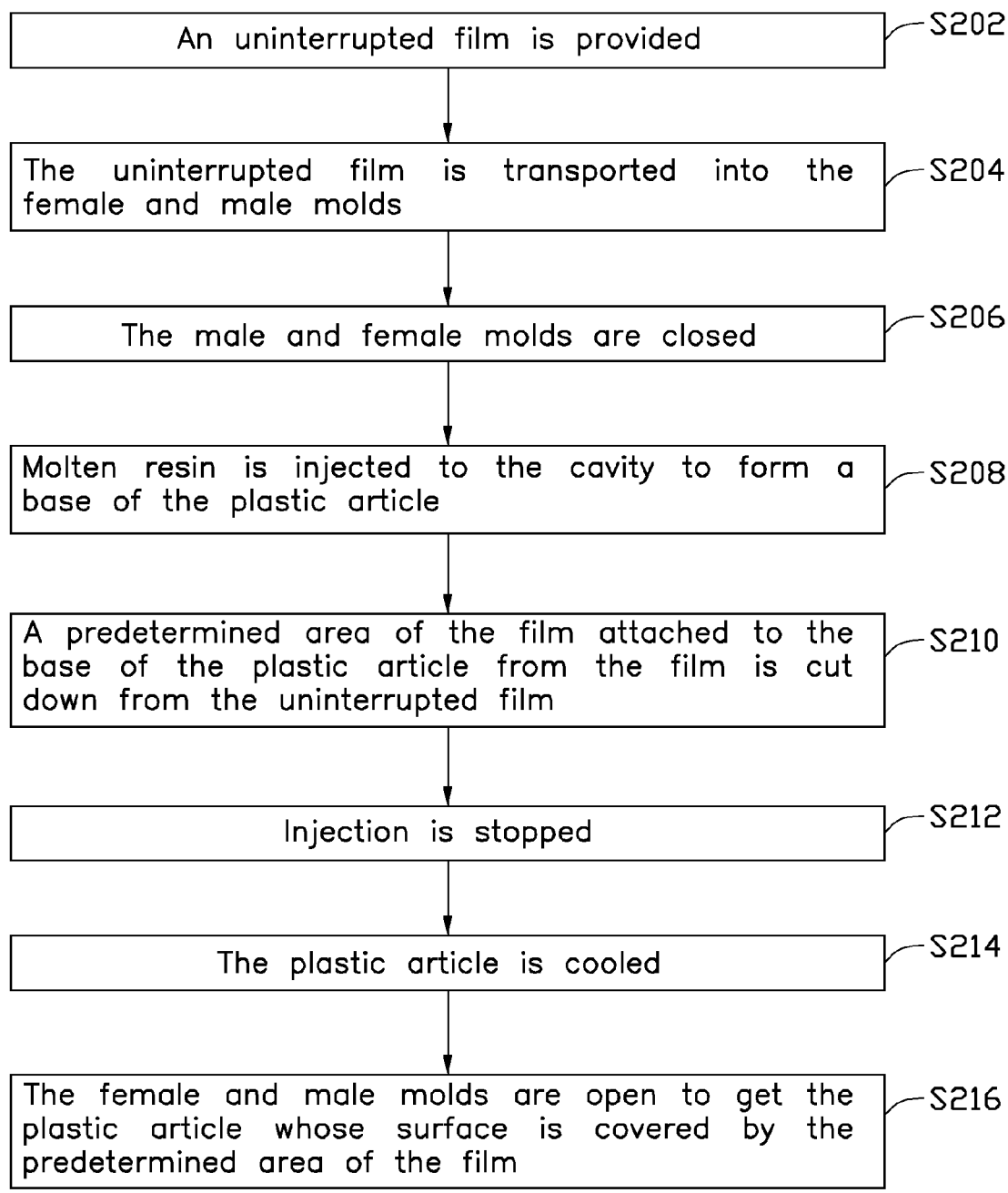
FIG. 6 is a flowchart of another embodiment of the method for manufacturing the plastic article.

Referring to FIG. 6, a second embodiment of a method for manufacturing a plastic article includes the following steps.

Step S202, an uninterrupted film 100 with patterns and characters printed thereon, is provided, and rolled around the transporting rollers 152 of the transport 15.

Step S204, the uninterrupted film 100 is transported between the female and male molds 25 and 30 by the transport 15, a predetermined area of the film 100 is attached to an inner surface of the cavity 22 of the female mold 25, as shown in FIG. 3. In one embodiment, the predetermined area of the film 100 attaches to the inner surface of the cavity 22 by vacuumizing the cavity 22 through the plurality of air venting holes 23 of the female mold 25.

Step S206, the male and female molds 30 and 25 are closed.

Step S208, molten resin is injected into the cavity 22 from the injection port 34 of the male mold 30 to form a base of the plastic article, as shown in FIG. 4.

Step S210, the predetermined area of the film 100 attached to the base of the plastic article from the film 100 is cut from the uninterrupted film 100 after about 90%-99.5% of the molten resin is injected into the cavity 22.

Step S212, injection stops.

Step S214, the plastic article cools.

Step S216, the female and male molds 25 and 30 open to retrieve the plastic article whose surface is covered by the predetermined area of the film 100 from the mold. At the same time, the transport 15 transports the film 100 to prepare for the next molding cycle.

Figure 7:
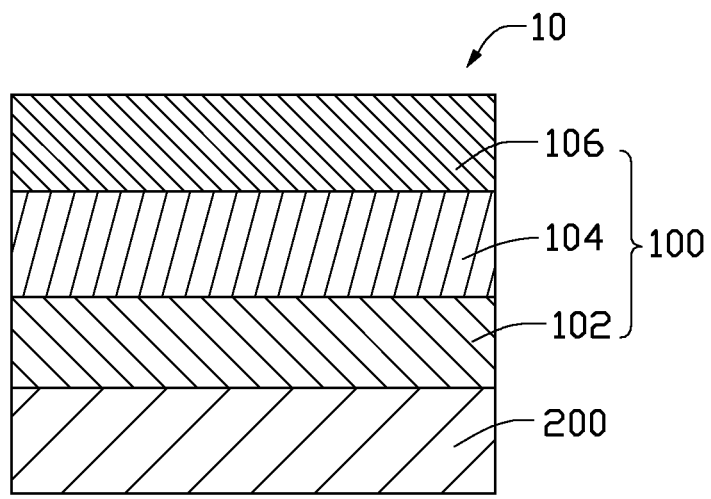
FIG. 7 is a cross-sectional view of a first embodiment of a plastic article.

Referring to FIG. 7, a first exemplary embodiment of a plastic article 10 manufactured by the above-mentioned method includes an attached film 100 and a base 200 made by injecting mold. The attached film 100 includes an attaching layer 102, a base layer 104, and a hard-coating layer 106.

The attaching layer 102 attaches the attached film 10 to the base 200 of the plastic article. The attaching layer 102 may be made from at last one type of a plurality of resin materials including acrylic, nitrification fiber, polyamine formate, chlorination rubber, vinyl chloride-co-vinyl-acetic ester copolymer, polyamide, polyester, epoxy, polycarbonate, olefin, or acrylonitrile-butylene-styrene monomer resin, for example. The attaching layer 102 is generally provided via concave, screen, and offset printing, or spraying, dip-coating method, or a coating in reverse order method, for example.

The base layer 104 is attached to the attaching layer 102 opposite to the base 200 and generally consists of at least one of polycarbonate, polyethylene terephthalate, acrylic, oriented polypropylene, and polyvinyl chloride, for example. The thickness of the base layer 104 can range from about 0.01 millimeters to about 0.125 millimeters.

The hard-coating layer 106 is attached to the base layer 104 opposite to the attaching layer 102. The hard-coating layer 106 functions as a scratch/abrasion-resistant layer for the base layer 104, the attaching layer 102, and the base 200. The thickness of the hard-coating layer 106 can range from about 0.0005 millimeters to about 0.035 millimeters. The hard-coating layer 106 is made of thermosetting resin, resin curable by ionizing radiation selected from the group consisting of ultraviolet ray and election beam.

Ultraviolet curable resin includes ultraviolet curable acrylic urethane resin, ultraviolet curable polyester acrylate resin, and ultraviolet curable epoxy acrylate resin. Ultraviolet curable resin can be used with a photoinitiator. For example, ultraviolet curable acrylic urethane resin is obtained by reaction of polyester polyol with isocyanate monomer or prepolymer and by reaction of a resultant product with acrylate or methacrylate monomer having hydroxyl groups. As the photoinitiator may be used with benzophenones, acetophenones, anthraquinone derivatives, singly or in combination. For improving formation of coating, thermoplastic acrylic resin may appropriately be selected and can be blended with ultraviolet curable resin.

Methods of manufacturing the hard-coating layer 106 includes coating selected from the group consisting of gravure coating, roll coating, and comma coating; or a printing process selected from the group consisting of gravure and screen printing.

Figure 8:
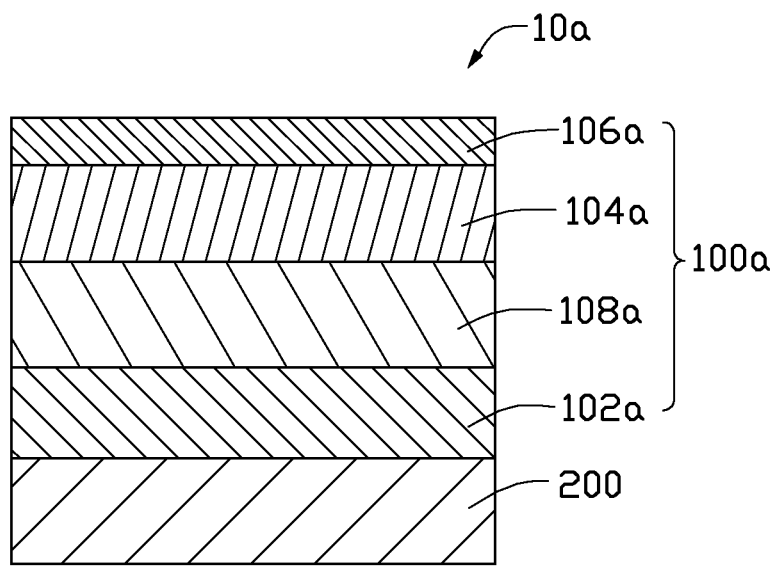
FIG. 8 is a cross-sectional view of another embodiment of a plastic article.

Referring to FIG. 8, another embodiment of a plastic article 10a manufactured by the above-mentioned method includes an attached film 100a and a base 200 made by injecting mold. The attached film 100a includes an attaching layer 102a, a base layer 104a, a hard-coating layer 106a, and a pattern layer 108a sandwiched between the attaching layer 102a and the base layer 104a.

The pattern layer 108a may be provided by printing ink on the base layer 104a. A metal decorative layer can be provided as the pattern layer 108a. The metal decorative layer may be aluminum, chromium, copper, nickel, indium, or tin, alone or combined, on the base layer 104a via either a vacuum evaporation or electroplating method.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A method for forming a plastic article using a male mold and a female mold, the method comprising:
    providing an uninterrupted film with a hard-coating layer;
    transporting the uninterrupted film between the female and male molds, with a predetermined area of the film attached to an inner surface of a cavity of the female mold;
    closing the male and female molds to a first position where a first parting surface of the male mold does not contact a second parting surface of the female mold;
    injecting molten resin into the cavity to form a base of the plastic article;
    during injecting, further closing the male and female mold to a second position where the first parting surface of the male mold contacts the second parting surface of the female mold, and cutting the predetermined area of the film from the uninterrupted film;
    stopping injecting;
    cooling; and
    opening the female and male molds to retrieve the plastic article.

2. The method of claim 1, wherein the male and female molds begin to close to the second position when about 90%-99.5% of the molten resin is injected into the cavity.

3. The method of claim 1, wherein the film further comprises a base layer attached to the hard-coating layer, and an attaching layer attached between the base of the plastic article and the base layer.

4. The method of claim 3, wherein the film further comprises a pattern layer having patterns and/or characters printed on the base layer and sandwiched between the base layer and the attaching layer.

* * * * *